(12) United States Patent
Tsay

(10) Patent No.: US 6,366,672 B1
(45) Date of Patent: Apr. 2, 2002

(54) MOBILE PHONE HOLDER

(76) Inventor: Wen-Feng Tsay, P.O. Box 24-108, Taipei (TW)

( * ) Notice: Subject to any disclaimer, the term of this patent is extended or adjusted under 35 U.S.C. 154(b) by 0 days.

(21) Appl. No.: 09/437,125

(22) Filed: Nov. 10, 1999

(51) Int. Cl.[7] .................................................. H04N 1/00
(52) U.S. Cl. ....................................................... 379/446
(58) Field of Search ................................ 379/446, 454, 379/455

(56) References Cited

U.S. PATENT DOCUMENTS 6,138,041 A * 10/2000 Yahia .......................... 379/446

* cited by examiner

Primary Examiner—Ahmad F. Matar
Assistant Examiner—Rasha Al-Aubaidi

(57) ABSTRACT

An improved mobile phone holder includes a phone seat body adapted for clamping and holding a mobile phone, an adapter seat provided at a lower end portion of the phone seat body adapted for electrical connection with a car's power source, and a receiving seat coupled onto the phone seat body and being provided with a connector for insertable connection with the mobile phone to permit electrical connection to cause internal paths to charge the mobile phone and to allow use of the mobile phone in a hand-free state. The receiving seat is replaceable with receiving seats having different connectors to adapt to different models of mobile phones. A shaft is disposed between an insertable connecting seat and the phone seat body to pivotally connect an arm rod for inter-connection. Each seat rod and the shaft are formed with inter-engageable toothed rims in corresponding positions. A compression spring is disposed between the other end of the shaft and the corresponding end of the seat rod to push one end of the shaft to cause the shaft to displace so that the toothed rims disengage from each other to allow relative rotation so as to permit change of relative angles thereof. When released, the compression spring's resetting force causes the shaft to return to its original state with the toothed rims engaged, thereby facilitating adjustment operation, enhancing stability, and preventing displacement and loosening of the mobile phone holder when subjected to vibration.

2 Claims, 3 Drawing Sheets

MOBILE PHONE HOLDER

BACKGROUND OF THE INVENTION (a) Field of the Invention

The present invention relates to an improved mobile phone holder, more particularly to an improvement directed to the hand-free characteristic, adaptability, convenience and stability of mobile phone holders. A phone seat body of the mobile phone holder has a lower end portion provided with an adapter seat connectable to a car's power source, and can be coupled with a receiving seat having a connector for insertable connection with the mobile phone to achieve electrical connection so as to permit charging of the mobile phone via internal paths and hand-free use of the mobile phone. The receiving seat can be replaced with receiving seats of different connectors to adapt to different models of mobile phones. A shaft is disposed between an insertable connecting seat and the phone seat body to pivotally connect an arm rod for inter-connection. Each seat rod and the shaft are formed with inter-engageable toothed rims in corresponding positions. A compression spring is disposed between the other end of the shaft and the corresponding end of the seat rod to push one end of the shaft to cause the shaft to displace so that the toothed rims disengage from each other to allow relative rotation so as to permit change of relative angles thereof. When released, the compression spring's resetting force causes the shaft to return to its original state with the toothed rims engaged, thereby facilitating adjustment operation and enhancing stability, and preventing vibration and possible loosening.

(b) Description of the Prior Art

In response to the growing popularity of mobile phones, cars are generally provided with mobile phone holders. However, use of mobile phones when driving has been banned in most countries. In addition, cars are also used to supply power to or charge mobile phones when batteries are consumed. For the sake of convenience, cars are usually provided with phone chargers or hand-free mobile phone holders, which however are space-occupying and uneconomical. Furthermore, due to different specifications of connectors, chargers or mobile phone holders are mainly directed to suit one type of model of mobile phone. When the user changes a brand or a model, he/she needs to buy a new charger or mobile phone holder. As there are tens of mobile phone manufacturers, and the connectors they used are different. Besides, as mobile phones of new functions and new models are being launched constantly, many users change mobile phones frequently to follow the trend, which is wasteful. There are also problems for manufacturers and distributors in terms of stocking and storage. Furthermore, as mobile phone holders are generally provided with extension arms to facilitate use, and the pivotal connecting portions or retractable structures are achieved mostly by abutting or friction, they are likely to displace when shaken and are inconvenient to adjust.

SUMMARY OF THE INVENTION

A primary object of the present invention is to provide an improved mobile phone holder, in which a phone seat body has an adapter seat provided at a lower end portion thereof for electrical connection with a car's power source, a receiving seat being coupled onto the phone seat body and being provided with a connector for insertable connection with the mobile phone to permit electrical connection to cause internal paths to charge the mobile phone and to allow use of the mobile phone in a hand-free state. The receiving seat can be replaced with ones having different connectors to adapt to mobile phones of different specifications to provide greater flexibility.

Another object of the present invention is to provide an improved mobile phone holder, in which a shaft is disposed between an insertable connecting seat and the phone seat body to pivotally connect an arm rod for inter-connection. Each seat rod and the shaft are formed with inter-engageable toothed rims in corresponding positions. A compression spring is disposed between the outer end of the shaft and the corresponding end of the seat rod to push one end of the shaft to cause the shaft to displace so that the toothed rims disengage from each other to allow relative rotation so as to permit change of relative angles thereof. When released, the compression spring's resetting force causes the shaft to return to its original state with the toothed rims engaged, thereby facilitating adjustment operation, enhancing stability, and preventing displacement and loosening of the mobile phone holder when subjected to vibration.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
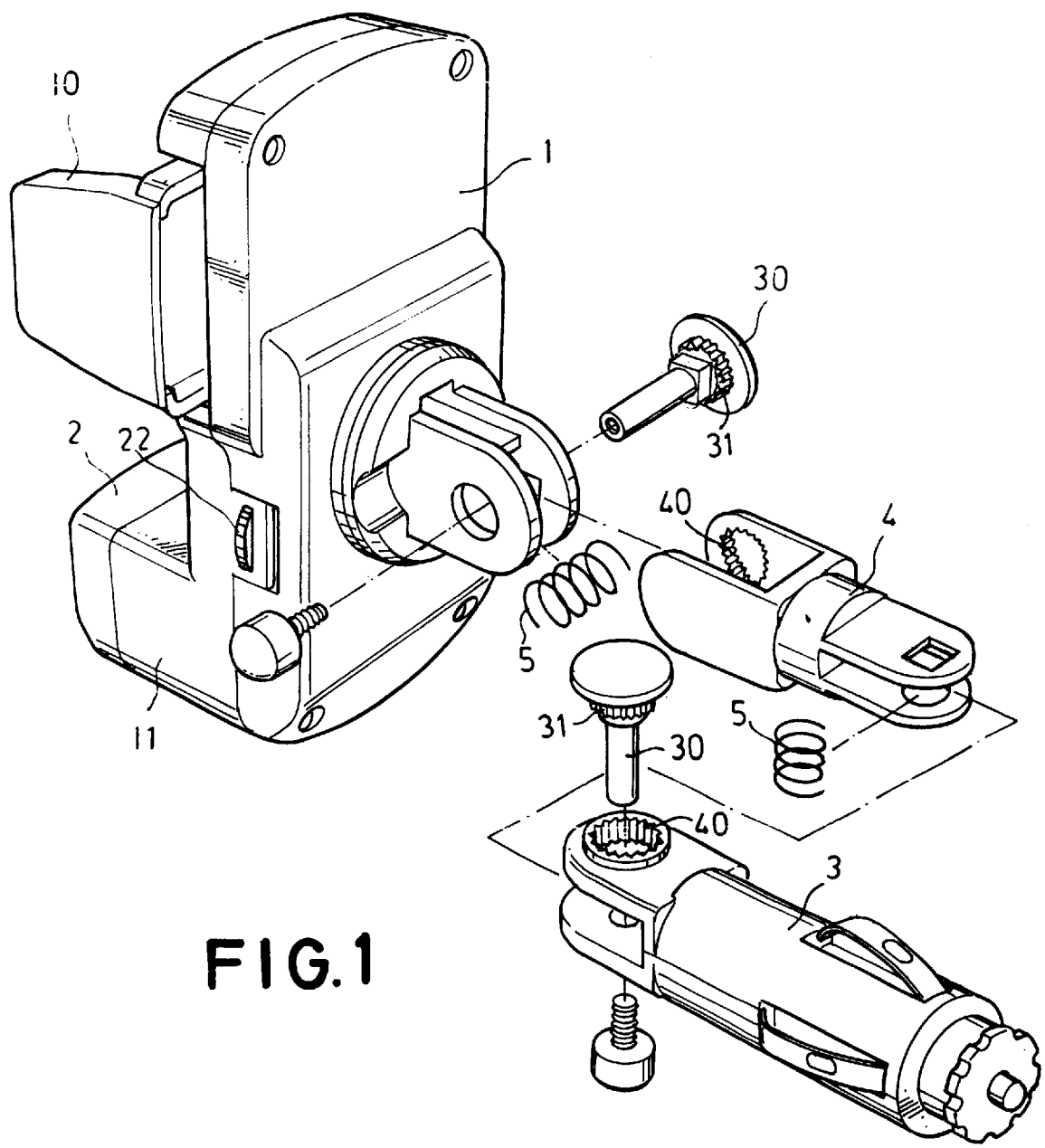
FIG. 1 is an exploded perspective view of a preferred embodiment of the present invention.
Figure 2:
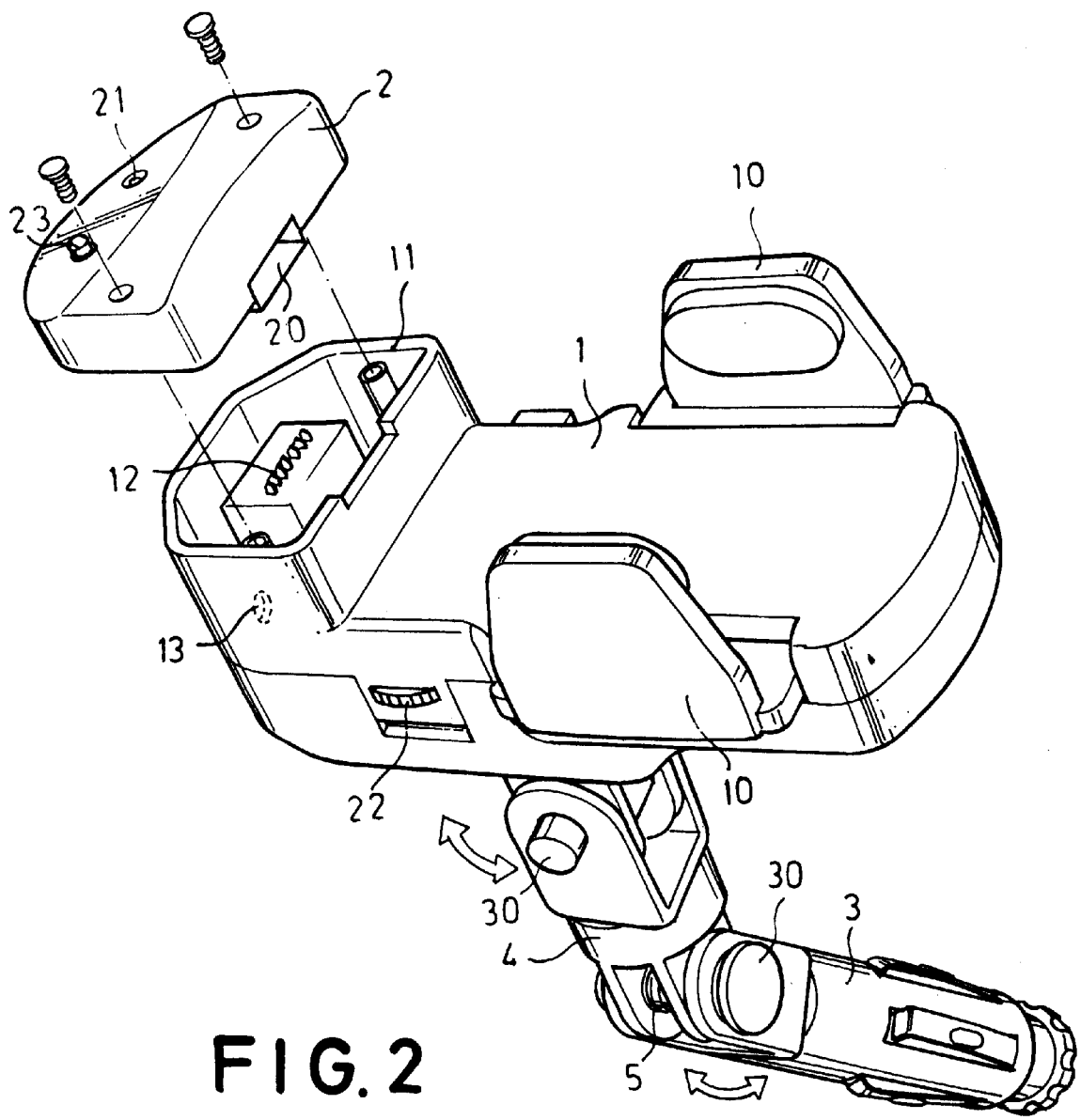
FIG. 2 is another exploded perspective view of the preferred embodiment.
Figure 3:
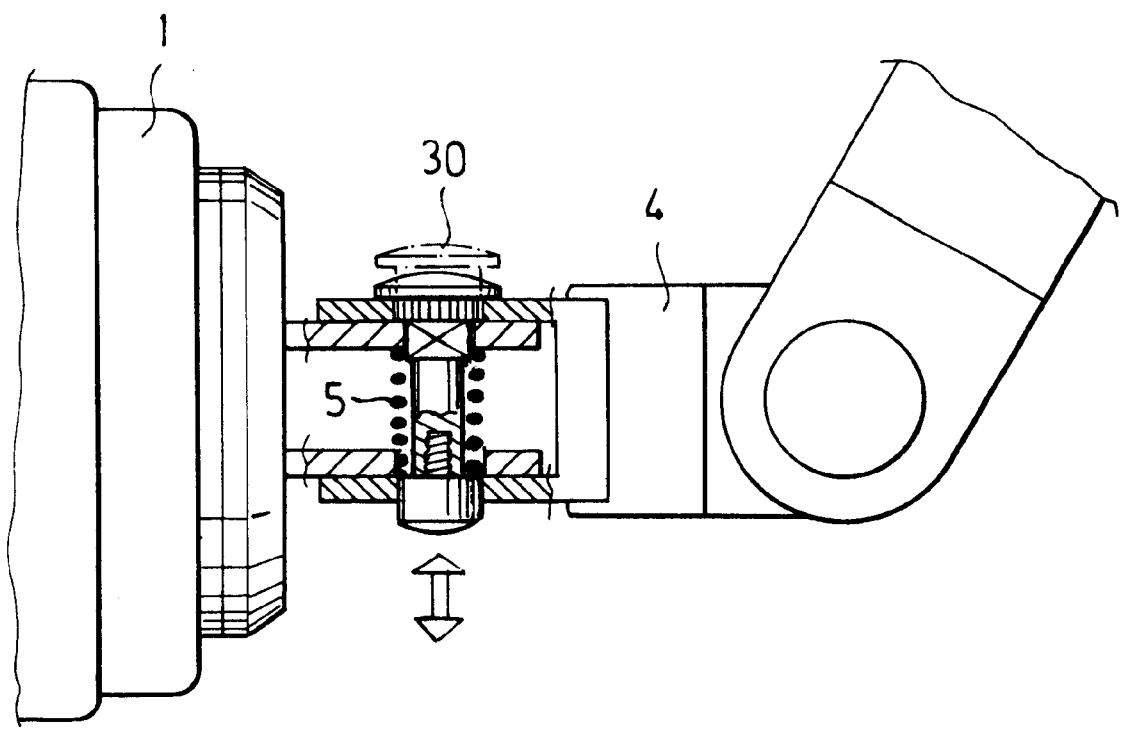
FIG. 3 is a sectional view of the preferred embodiment.

With reference to the drawings, the present invention essentially includes a phone seat body 1, a receiving seat 2, an insertable connecting seat 3, and an arm rod 4. The phone seat body 1 is a supporting body that includes left and right clamping pawls 10, and that is adapted to adjustably receive a mobile phone and clamp the mobile phone in position. The phone seat body 1 has a lower end portion provided with and adapter seat 11 to connect externally to a car's power source. The receiving seat 2 is provided with a connector 20 and may be inter-connected with the adapter seat 11 in an assembled manner to allow insertably connection of the mobile phone so that, by means of a socket 12, electrical connection can be achieved, and the internal circuitry can permit power supply to the mobile phone as well as sound reception and magnification. Between the insertable connecting seat 3 and the phone seat body 1, a shaft 30 can be used to pivotally connect the arm rod 4 that extends outwardly. Each insertable connecting seat 3 or arm rod 4 and the shaft 30 are formed to have inter-engageable toothed rims 31, 40 in corresponding positions. A compression spring 5 is disposed between the other end of the shaft 30 and the corresponding end of the insertable connecting seat 3 or arm rod 4. The manner of securing and connecting the insertable connecting seat 3 is not restricted to that as shown in the drawings, the insertable connecting seat 3 may also be secured in the interior of the car by using adhesive.

In actual use, the mobile phone is inserted with its rear end into the connector 20 of the receiving seat 2 so that they are insertable coupled. The mobile phone is then held firmly in position by means of the clamping pawls of the phone seat body 1. The insertable connecting seat 3 is inserted into a cigarette light slot of the car to connect to the car's power source. In addition, by pressing one end of the shaft 30, the compression spring 5 is caused to retract under pressure. Due to the displacement of the shaft 30 and the disengagement of the toothed rims 31, 40, inter-rotation may be generated at the pivotal connection of the insertable connecting seat 3 or arm rod 4 and the arm rod 4 to adjust and change the relative angle so that the mobile phone on the phone seat body 1 can be adjusted to a most suitable position. Upon release of the pressure, the compression spring 5 will quickly reset to cause the shaft 30 to automatically return to its original state, with the toothed rims 31, 40 inter-engaged to set a fixed angle that is not likely to displace. It can therefore be appreciated that the present invention permits simple and convenient adjustment, and can prevent displacement of the mobile phone holder when subjected to shock. Besides, via the internal paths of the phone base body 1 and the receiving seat 2, the connected circuitry enables charging of the mobile phone, with the state thereof indicated by an indicator light 21. During power-on or power-off, an adjusting button 22 may be used to regulate the effects of sound reception and amplification of the microphone 23. Hence, the present invention provides multiple functions and use of the mobile phone in a hand-free state. During replacement or when the present invention is to be sold for use with different mobile phones, it is only necessary to take down the receiving seat 2 to replace it with another receiving seat 2 having a corresponding mobile phone connector, thereby preventing waste and overstocking, and providing greater flexibility.

Although the present invention has been illustrated and described with reference to the preferred embodiment thereof, it should be understood that it is in no way limited to the details of such embodiment but is capable of numerous modifications within the scope of the appended claims.

What is claimed is:

1. A mobile phone holder comprising:

a) a phone seat body having two clamping pawls configured to hold a mobile phone, the phone seat body having an adapter seat portion with a receiving seat having an electrical connector engageable with a mobile phone, the phone seat body also having a first attachment hole;

b) a connecting seat configured to be inserted into a power outlet of a vehicle, the connecting seat having a second attachment hole with a first toothed rim;

c) a connecting arm rod having a first portion with a third attachment hole with a second toothed rim and a second portion having a fourth attachment hole, the first portion located such that the third attachment hole is aligned with the first attachment hole and the fourth attachment hole is aligned with the second attachment hole;

d) a first shaft having a toothed portion and extending through the first and third attachment holes, the first shaft being movable between a first position wherein the toothed portion engages the second toothed rim to prevent relative pivotal movement between the phone seat and the connecting arm rod, and a second position wherein the toothed portion is disengaged from the second toothed rim, thereby allowing relative pivotal movement between the phone seat and the connecting arm rod;

e) a first spring acting on the first shaft so as to bias the first shaft toward the first position;

f) a second shaft having a toothed portion and extending through the second and fourth attachment holes, the second shaft being movable between a first position wherein the toothed portion of the second shaft engages the first toothed rim thereby preventing relative pivotal movement between the connecting arm rod and the connecting seat, and a second position wherein the toothed portion of the second shaft is disengaged from the first toothed rim, thereby allowing relative pivotal movement between the connecting arm rod and the connecting seat; and, g) a second spring acting on the second shaft so as to bias the second shaft toward the first position.

2. The mobile phone holder of claim 1 wherein the receiving seat is removably mounted on the phone seat body.